R. KLEIN & T. BRUECK.
CAMERA SHUTTER.
APPLICATION FILED OCT. 20, 1911.
1,091,666.
Patented Mar. 31, 1914.
3 SHEETS—SHEET 1.
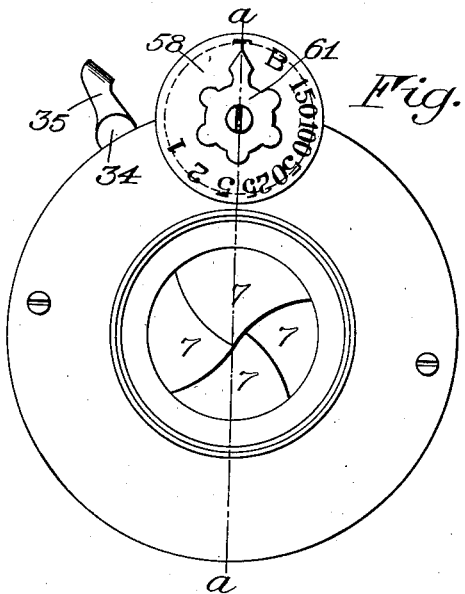
Witnesses
A. M. Whitmore.
L. M. Simms.
Inventors
Rudolph Klein and
Theodor Brueck
By H. T. Simms
their Attorney

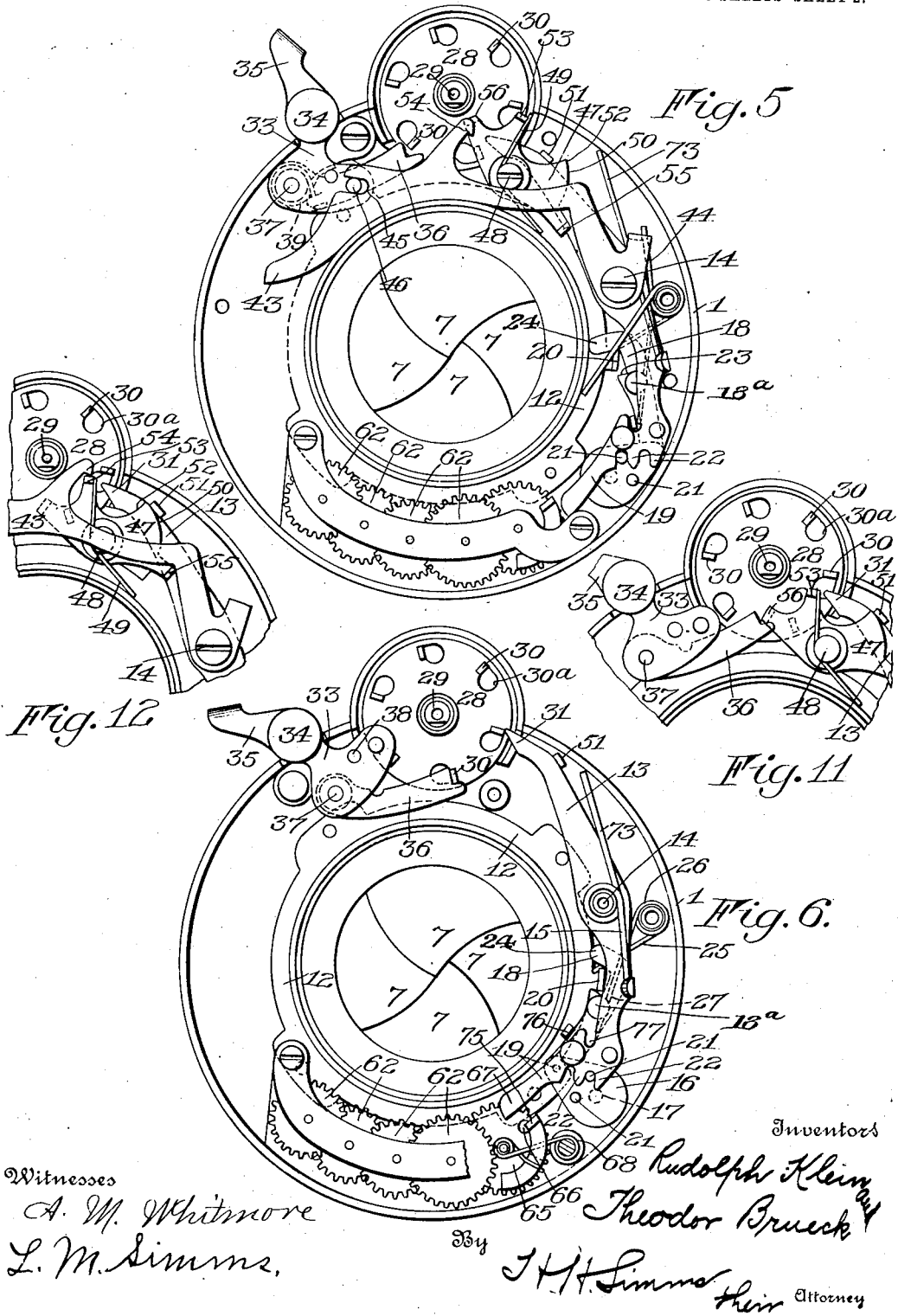

R. KLEIN & T. BRUECK.
CAMERA SHUTTER.
APPLICATION FILED OCT. 20, 1911.
1,091,666.
Patented Mar. 31, 1914.
3 SHEETS—SHEET 3.
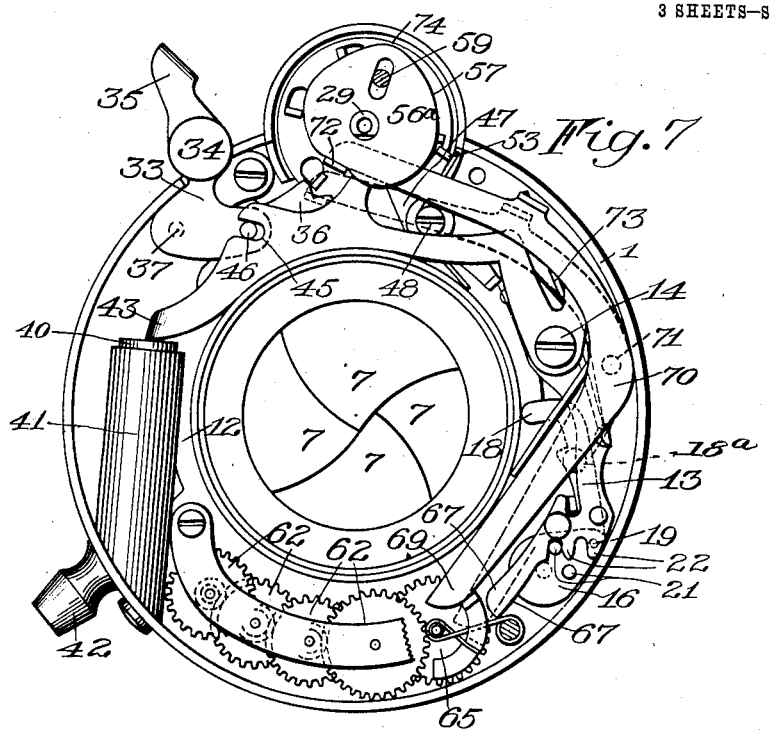
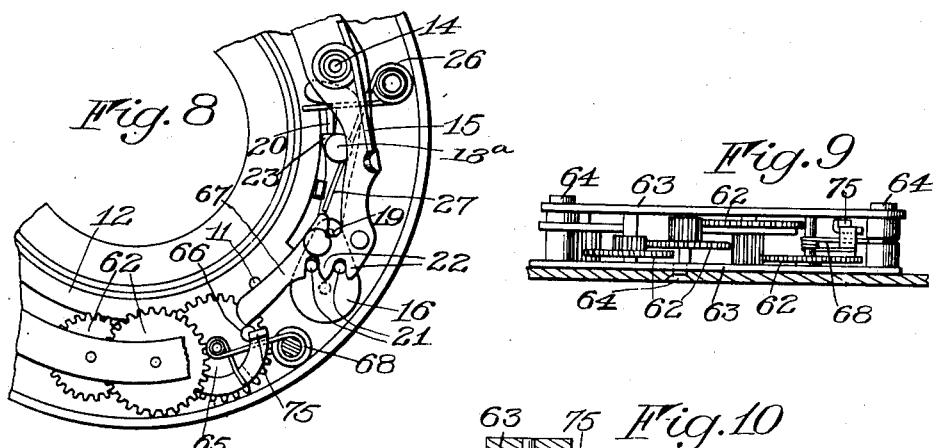
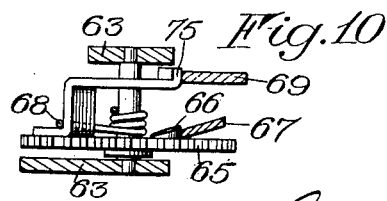
Witnesses
Ada M. Whitmore.
L. M. Simms.
Inventors
Rudolph Klein
Theodor Brueck
By H. H. Simms
Their Attorney

UNITED STATES PATENT OFFICE.

RUDOLPH KLEIN AND THEODOR BRUECK, OF ROCHESTER, NEW YORK.

CAMERA-SHUTTER.

1,091,666.    Specification of Letters Patent.    Patented Mar. 31, 1914.

Application filed October 20, 1911. Serial No. 655,729.

*To all whom it may concern:*

Be it known that we, RUDOLPH KLEIN and THEODOR BRUECK, of Rochester, in the county of Monroe and State of New York, have invented a new and useful Improvement in Camera - Shutters, which improvement is fully set forth in the following specification and shown in the accompanying drawings.

The present invention relates to camera shutters and an object of the same is to provide an improved shutter mechanism in which a plurality of blades is operated by a single member.

Another object of this invention is to provide a common controlling body for the detaining means and the retarding mechanism rotatable in a complete circle, so that the body may be rotated in either direction to the desired position, this being especially desirable in adjusting the shutter after focusing.

Still another object of the invention is to improve the construction of different parts of the shutter with the purpose in view to simplify the operation and manufacture thereof.

A still further object of the invention is to provide an improved retarding means.

To these and other ends the invention consists in certain parts and combinations of parts all of which will be hereinafter described, the novel features being pointed out in the appended claims.

In the drawings: Figure 1 is a front view of a shutter constructed in accordance with the present invention; Fig. 2 is a section on the line $a$—$a$ of Fig. 1 with all parts of the shutter removed, except the shutter operating ring and the controlling body; Fig. 3 is a view of the shutter with the rear closure and one of the blades removed; Fig. 4 is a view of the shutter showing the front closure and most of the operating parts of the shutter removed; Fig. 5 is an interior view of the shutter with the controlling body and the bulb piston and cylinder removed, the shutter being in its normal or closed position; Fig. 6 is a view similar to Fig. 5 with the detaining member removed, the shutter being shown in the position it occupies during the setting thereof; Fig. 7 is an interior view of the shutter with all the parts in normal positions; Fig. 8 is a detail view showing the relative positions of the master member and the retarding mechanism, when the shutter is open; Figs. 9 and 10, are detail views of the retarding mechanism; and Figs. 11 and 12 are detail views of the detaining member and coöperating parts.

In carrying out this invention, there is employed a casing comprising a ring 1 having an apertured partition 2 arranged therein and providing chambers 3 and 4 on opposite sides thereof, an annular flange 5 projecting from the partition 2 about the aperture therein to provide the lens tube and make the chamber 4 annular in form. The chamber 3 may be closed by a removable closure 6 which may carry, as usual, the iris diaphragm.

Within the chamber 3 may be arranged the shutter blades 7 which preferably are slotted at 8 so that they may turn loosely on pivots 9 projecting from one side of the partition 2. The latter may also be provided with slots 10, in which work pins 11, that turn in the blades 7 and are carried by a ring 12 arranged within the chamber 4 and turning upon the flange or lens tube 5 to be centered by the latter, the blades with said ring forming, in this instance, the shutter mechanism.

A feature of this invention is the manner of holding the ring 12 to its bearing 5, facilitating the assembling of the parts of the shutter. When the blades are held normally closed under the action of the master member or other means, portions $12^a$ on the shutter lie beneath overhanging portions or projections $12^b$ on the partition 2 to hold the ring to its bearing 5. During the action of the shutter these portions $12^a$ never pass from beneath the overhanging projections $12^b$, but they have a movement beyond the normal movement to open the blades so that the ring can be removed or readily placed beneath the overhanging projections in the first instance.

The operating mechanism for the shutter mechanism may comprise a master member 13 preferably pivoted at 14 and having a spring 15 tending to hold the same in one position. The master member connects with the shutter mechanism preferably through an intermediate member 16 which turns about an axis 17 and carries a latch or pawl 18 pivoted thereto at 19, said latch coöperating with a lug 20 on the ring 12. The intermediate member 16 between the latch 18 and master member 13 is provided in order that the movement of the master member may be amplified in the pivot of the latch, this connection, in this instance, being in the form of teeth 21 on the member 16 engaging teeth 22 on the master member, thus providing intermeshing gears on said parts. The connection between the latch and the ring 12 is such that, during the movement of the master member, in the direction to store energy in the spring 15, the latch does not shift the ring 12 and thus provides a lost-motion connection between the master member and the shutter mechanism. However, on the movement of the master member in the opposite direction, under the action of the spring, a shoulder 23 on the latch engages the projection 20 and opens the shutter, the pivot 19 of the latch being moved in the opposite direction about the time the shutter reaches the open position when the shoulder 24 engages the projection 20 and pulls the shutter closed. The latch, at the end of this movement, holds the shutter closed in connection with an arm 25 on the coil spring 26, another arm 27 on said spring bearing against a shoulder 18ª on the latch 18 and holding the latter toward the ring 12. The movement of the master member under the action of spring 15 is limited by a shoulder 76 on the latch 18 engaging within the notch 77 of the master member.

For actuating the master member, any suitable means may be provided. In this instance, the master member is carried to the limit of its movement in one direction and then released automatically. This may be effected by an actuating member in the form of a wheel 28 which is mounted to turn in a complete circle on a post 29 and is preferably formed of sheet material having laterally extending lugs 30 struck up from the metal on one side thereof and providing openings 30ª. These lugs travel in a path which intersects the path of travel of the end 31 of the master member, so that each lug will engage the master member, moving the same therewith against the action of the spring 15, until a point is reached where the lug slips off or frees the master member, permitting the latter to move in the opposite direction under the action of its spring. The movement of the actuating wheel 28 in the reverse direction may be prevented by a leaf spring 32 (see Fig. 4) the free end of which is adapted to enter the openings 30ª and engage with the lugs 30.

For operating the actuating member 28, there may be employed an operating member 33 pivoted at 34 and having a finger piece 35 extending to the exterior of the casing. Within the casing the actuating member has a pawl or dog 36 pivoted thereto at 37 and pressed toward a stop 38 by a spring 39. The free end of this pawl, when the operating member is in normal position as shown in Fig. 5 lies in such a manner that, upon the turning of the operating member 33 upon its axis, such free end will engage one of the lateral projections 30 and turn the wheel or rotary actuating member 28 such a distance that the master member 13 will be moved by another one of the projections 30 until such master member slips off the last mentioned projection. The operating member 33 may also be operated by means of a pump piston 40 arranged within a cylinder 41 located within chamber 4 and adapted to receive air by way of an inlet 42 to which air is delivered under pressure from a bulb or other device. The plunger 40 may coöperate with the free end of a lever 43 which, for the purpose of distinction, will be hereinafter referred to as the bulb lever. The latter has a common pivot 14 with the master lever and is pressed toward the pump piston 40 by a spring 44. Between its pivot 14 and its free end, the bulb lever has a connection with the operating lever 33 preferably comprising a slot 45 in the bulb lever, operating on a projection 46 on the operating lever 33. The bulb lever, the operating lever 33 and the actuating wheel 28, will be hereinafter referred to as the operating devices. It is apparent that some of the features of this invention are capable of use with operating devices having a construction different from that heretofore described.

For detaining or holding the shutter open, there is employed preferably a single detaining member 47 which coöperates with certain parts of the shutter to perform the above function. In this instance, the detaining member is pivoted at 48 and is acted upon by a spring 49 which tends to move a shoulder 50 thereon into the path of a laterally extending shoulder 51 on the master member whenever the master member is moved away from its normal position, the shoulder 51 coöperating with the face 52 on the detaining member and holding the latter against movement under the action of its spring until the master member is moved to a certain position by the operating devices. The master member does not engage the shoulder 50 of the detaining member until said master member has moved a sufficient distance to open the shutter, or in other words, after the end 31 of the master member has slipped off of one of the projections 30, the master member travels a short distance before the lug or shoulder 51 thereon engages the shoulder 50 on the detaining member.

The distance which the detaining member moves under the action of its spring 49, is determined by controlling means to be hereinafter described enabling the shutter to be used for time, bulb or instantaneous exposures. For instantaneous exposure the detaining member does not move at all, and, as a consequence, the master member is not held thereby, as the shoulder 50 on the detaining member will be located out of the path of the shoulder 51 of the master member 13.

For bulb exposures, the detaining member 47 moves to such a point that the shoulder 50 moves into the path of the shoulder 51 of the master member and holds the latter until pressure on the bulb is relieved, when the bulb lever returns under the action of its spring 44 and engages a projection 55 on the detaining member, moving the shoulder 50 of the latter out of the path of the shoulder 51 on the master member, the spring 44 of the bulb lever, of course, being stronger than the spring 49 of the detaining member. This permits the master member to close the shutter mechanism.

For time exposures, the detaining member makes its full movement, and consequently a shoulder 53 thereon moves into the path of a shoulder 54 on the bulb lever 43 and prevents a complete return of such bulb lever, thereby preventing the latter from engaging with the shoulder 55 on the opposite side of the pivot 48 of the detaining member and moving the shoulder 50 out of the path projection 51 of the master member. The bulb lever and the detaining member remain interlocked until the detaining member is shifted so that the bulb lever can return. It is apparent that, if the bulb lever cannot return to its normal position, the dog 36 will not lie so as to engage one of the projections 30 and therefore said dog may be employed for shifting the detaining member. To this end, the detaining member is provided with a shoulder 56 which lies in the path of the dog 36 so that, upon the action of the member 33, either by the finger piece 35, or the pump piston 40, the dog 36 will engage the shoulder 56 and move the shoulder 53 from beneath the shoulder 54, thus permitting the master member and the bulb lever to return to their initial positions.

For the purpose of controlling the detaining member 47, there may be provided a controlling body 56ª preferably having a face 57 extending continuously or entirely about the same. This cam body is rotatable on the post 29 and is operable by means of an indicating disk 58 having a pin and slot connection 59 with the cam 56ª and rotatable on the post 29 with said cam. The disk 58 closes a pocket or auxiliary chamber 60 in which the wheel 28, the controlling body or disk 56 and post 29 are located, the post having secured to its outer end a stationary indicator or pointer 61 which points to indications on the outside of the disk 58.

The retarding of the closing movement of the shutter may be effected for the purpose of obtaining instantaneous exposures of different durations by any suitable retarding mechanism. There has been provided in this instance a retarding mechanism comprising a plurality or train of wheels 62 geared together and held between two bearing plates 63 which are removably secured within the chamber 4 by means of screws or other fasteners 64 permitting the retarding mechanism to be removed bodily. Also geared to these wheels is an oscillatory member 65 in the form of a wheel having a projection 66 extending from one side thereof. For coöperation with this projection, the master member 13 is provided with an arm or extension 67 beyond its connection with the intermediate member 16, the projection being beveled and the arm being slightly twisted or bent at an angle to the plane of the master member, so that in one direction of the movement of the master member, the extension 67 will coöperate with the projection in such a manner that it will slip over the projection without affecting the retarding device, while, in the other direction of the movement of the master member, the extension will coöperate with the projection 66 and cause the latter with the train of gearing to move with the master member. As the oscillatory member 65 and the master member extension 67 swing about different centers, a point will be reached during their co-movement when the extension 67 will slip off the projection 66, after which the oscillatory member 65 and the gear wheels 62 will return to their initial positions under the action of a spring 68.

For regulating or controlling the retarding action of the retarding mechanism, there may be employed an adjustable stop preferably formed by the end 69 of a two-armed lever 70 which is pivoted at 71, the other arm of said lever having a shoulder 72 which coöperates with the cam face 57 of the controlling body 56ª. In the present instance, the cam face 57 has a portion provided exclusively for coöperation with the projection 53 on the detaining member and a portion provided exclusively for the controlling lever 70. Yet, each of these portions is so connected that the cam body may be rotated in a complete circle without injury to the detent 47 or the controlling lever 70. The lever is normally pressed against the cam face 57 by a spring arm 73, which may be a part of the spring 15 which acts on the master member. It is apparent that when the shoulder 72 moves on the cam face 57 toward the high-point 74, the end 69 will vary the starting position of the projection 75 on the oscillatory member 65 and in this way vary the time of connection between the master member extension 67 and the projection 66, thus varying the retarding action. At the same time that the controlling lever 70 is moved to vary the retarding action, the tension of the spring arm 73 is varied and consequently the tension of the master-member spring 15 is changed. With increased tension on the master member spring, the retarding action is reduced and with the reduced tension on the master-member spring, the retarding action is increased. By this construction there is secured a shutter in which a greater number of changes in the speed may be obtained.

The operations of this shutter will be apparent from the foregoing description but it may be summarized generally as follows: The operator having set the shutter, say, for time exposures, he presses the finger piece 35 causing the wheel 28 to be shifted and the latter to shift the master member 13 which is engaged by the shoulder 50 on the detaining member 47 to hold the shutter open, the master member shifting intermediate member 16 to operate the latch 18 which shifts the ring 12. To close the shutter, the finger piece 35 is again depressed and dog 36 thereof engages with the shoulder 56 to kick the detaining member out of the path of the master member which now closes the shutter, the detaining member, while in detaining position for time exposure, being held by the shoulder 54 on the bulb lever engaging with the shoulder 53 on the detaining member. For bulb exposure, the cam body 56ª shifts the detaining member so that the shoulders 53 and 54 cannot engage, but the shoulder 50 on said detaining member will move into the path of the master member. As long as the bulb is held, the bulb lever 43 cannot engage the projection 55 on the detaining member, but, upon the release of the bulb, the shoulder 55 is engaged and the detaining member is removed from engagement of the master member, permitting the shutter to close. During bulb and time exposure, the retarding mechanism is held by means of the end 69 of lever 70 from out of the path of the master member, that is, beyond the limit of movement of said member. For instantaneous exposures of different durations, the cam body 56ª is rotated so as to let the retarding mechanism into the path of the master member, and the detaining member is moved out of the path of the master member, so that, after the master member is released by the actuating wheel 28, the master member proceeds to open and then immediately to close the shutter, the closing action being proportionate to the adjustment of the cam body 56ª. After the master member has closed the shutter, the stop 75 on the retarding mechanism returns to its initial position which is determined by the end 69 of the lever 70.

A camera shutter constructed in accordance with this invention provides a simple way of controlling the plurality of shutter blades as all of them are controlled by a single ring which utilizes the lens tube for its support. The constructions of several of the parts of the shutter have been improved for the purpose of giving greater durability and rendering the cost of manufacture of the shutter less expensive. The retarding mechanism is of novel construction as is the control therefor. The common controlling body for the retarding mechanism and the detaining member is movable in a complete circle so that it is possible to shift said controlling body in either direction from any position, thus facilitating the adjustment of the shutter.

What we claim as our invention and desire to secure by Letters Patent is:

1. In a camera shutter, the combination with a casing having a slotted partition provided with an aperture and a lens tube integral with and projecting from one side of the partition about the aperture, of a plurality of blades arranged on the opposite side of the partition, and an operating ring for the blades turning on the tube and having projections thereon extending through the slots of the partition and connected to the blades.

2. In a photographic shutter, the combination with a plurality of blades, of a ring for moving said blades, a bearing on which said ring turns, means normally acting on the ring to hold the blades closed, portions overhanging the ring while the blades are closed to hold the ring to its bearing, the ring having a turning movement beyond its movement to open the blades so that portions of said ring may be carried away from the overhanging portions in order to remove or place the ring.

3. In a camera shutter, the combination with a shutter mechanism and a master member for operating the same, of an actuating wheel for the master member formed from sheet material and having laterally projecting lugs on one side to coöperate with the master member, said lugs being struck up from the material of the wheel to provide openings, and a spring dog to enter said openings to prevent the turning of the wheel in one direction.

4. In a camera shutter, the combination with a shutter mechanism, of a master member, an intermediate swinging member having a latch connection with the shutter mechanism, and a plurality of teeth on the master member and also on the intermediate member coöperating to cause the master member to move the intermediate member.

5. In a camera shutter, the combination with a shutter mechanism, of a latch coöperating with the shutter mechanism, a master member connected with the latch to operate the latter and a single spring acting on the shutter mechanism to hold the shutter closed and acting on the latch to hold the latter in coöperative relation with the shutter mechanism.

6. In a camera shutter, the combination with a shutter mechanism, and operating mechanism therefor, embodying a master member of a train of retarding gear wheels, one of which is provided with a lateral projection engaged directly by the master member.

7. In a camera shutter, the combination with a shutter mechanism, and operating mechanism therefor embodying a master member, of a train of gear wheels, one of which is provided with a laterally extending projection directly engaged by the master member to move the train of gears in one direction, and a spring for moving the train of gears in the other direction.

8. In a camera shutter, the combination with a shutter mechanism and operating mechanism therefor embodying a master member, of a train of gear wheels, an oscillatory member having teeth thereon meshing with the teeth of one of said wheels and directly engaged by the master member to be moved in one direction thereby, and a spring for moving said oscillatory member in the other direction.

9. In a camera shutter, the combination with a shutter mechanism, and operating mechanism therefor, of retarding mechanism comprising a train of wheels, an oscillatory member geared to the wheels, the oscillatory member being engaged by a part of the operating mechanism and moved by the latter to a position where said operating mechanism will slip off the oscillatory member, and a spring for moving said oscillatory member in the opposite direction when released by the mechanism.

10. In a camera shutter, the combination with a shutter mechanism, an operating mechanism therefor embodying a master member, of retarding mechanism embodying a train of wheels geared together, an oscillatory member geared to said wheels, the oscillatory member being engaged by the master member and moved by the latter to a position where said master member slips off the oscillatory member, and a spring for moving said oscillatory member in the opposite direction when released by the master member.

11. In a camera shutter, the combination with a shutter mechanism, of a detaining member coöperating with parts of the shutter for holding the shutter mechanism open, a spring for moving said detaining member to detaining position, a retarding mechanism coöperating with parts of the shutter for delaying the action of the shutter mechanism, a pivoted lever controlling the retarding mechanism to vary the action of the latter, and a rotary disk having a single controlling face extending entirely about the same and coöperating with the detaining member and the lever in the same plane.

12. In a camera shutter, the combination with a master member and a spring for moving the same in one direction, of a retarding means for delaying the action of the master member under the action of its spring, and a common means for varying the action of the retarding means and the tension of the spring of the master member.

13. In a camera shutter the combination with a master member and a spring for moving the same in one direction, of a retarding mechanism for retarding the operation of the master member under the action of its spring, and controlling means for varying the action of the retarding means, connected to the spring of the master member for varying the tension of the latter with the varying of the action of the retarding means.

14. In a camera shutter, the combination with a master member and a spring for moving the same in one direction, of a retarding mechanism for retarding the operation of the master member under the action of its spring, and a lever for controlling said retarding mechanism, connected to the spring of the master member to vary the tension of the latter with the varying of the action of the retarding means.

15. In a camera shutter, the combination with a master member and a spring for moving the same in one direction, of a retarding means for delaying the movement of the master member under the action of the spring, a spring for moving the retarding means in the opposite direction, and a lever connected to the spring of the master member to vary the tension thereof and arranged to limit the return movement of the retarding means.

16. In a photographic shutter, the combination with a master member, of a train of wheels, a spring moving said train in a direction opposite to that in which it is moved by the master member, an oscillating member connected to said train of gears to be moved therewith by the spring, and to be engaged by the master member to be moved in the other direction, and a controlling member controlling said oscillating member to determine the length of the engagement between the master member and the oscillatory member.

17. In a photographic shutter, the combination with shutter blades and a master member having a lost motion connection with the shutter blades permitting said master lever to move in one direction without actuating the shutter blades and in the other direction to effect the opening and the closing of the shutter blades, of a retarding mechanism embodying a train of wheels and an oscillatory member having a portion thereon adapted to be engaged by the master member to shift the wheels and the oscillating member when the master member is moving in a direction to effect the opening and the closing of the shutter blades, a spring for moving the wheels and the oscillatory member in the other direction as the master member is moved in the direction in which it does not actuate the shutter blades, and means for varying the amount of movement of the wheels and the oscillatory member under the spring to vary the retarding action.

RUDOLPH KLEIN.
THEODOR BRUECK.

Witnesses:
HAROLD H. SIMMS,
ADA M. WHITMORE.